United States Patent [19]

Komerska et al.

[11] Patent Number: 5,096,222
[45] Date of Patent: Mar. 17, 1992

[54] VEHICLE AIR BAG MODULE AND METHOD OF ASSEMBLY

[75] Inventors: Anthony J. Komerska, Sterling Heights; Mark T. Lecznar, Dearborn Heights; John P. Wallner, Rochester Hills; Richard E. Shellabarger, Sterling Heights, all of Mich.

[73] Assignee: TRW Vehicle Safety Systems Inc., Lyndhurst, Ohio

[21] Appl. No.: 629,427

[22] Filed: Dec. 18, 1990

[51] Int. Cl.⁵ .................................... B60R 21/16
[52] U.S. Cl. ........................ 280/732; 280/743
[58] Field of Search .......... 280/728, 730, 731, 732, 280/743

[56] References Cited

U.S. PATENT DOCUMENTS

| | | | |
|---|---|---|---|
| 3,712,568 | 1/1973 | Grasso et al. | 244/148 |
| 3,930,664 | 1/1976 | Parr et al. | 280/732 |
| 4,111,457 | 9/1977 | Kob et al. | 280/728 |
| 4,577,816 | 3/1986 | Foster | 244/148 |
| 4,698,107 | 10/1987 | Goetz et al. | 149/7 |
| 4,817,828 | 4/1987 | Goetz | 222/3 |
| 4,842,300 | 6/1989 | Ziomek et al. | 280/732 |
| 4,915,410 | 4/1990 | Bachelder | 280/732 |
| 4,941,678 | 7/1990 | Lauritzen et al. | 280/732 |

FOREIGN PATENT DOCUMENTS 310142 12/1990 Japan ....................... 280/743

Primary Examiner—Kenneth R. Rice
Attorney, Agent, or Firm—Calfee, Halter & Griswold

[57] ABSTRACT

An air bag module construction, and several new and useful components are provided for forming an air bag module. One of the new components comprises a receptacle with a specially designed reaction device which (i) is adapted physically to separate the receptacle into distinct compartments for an inflator and an air bag, and (ii) reinforces an open end of the receptacle in the areas most prone to deformation during deployment of the air bag. Another new and useful component comprises a prepackaged air bag unit which is loaded into and fastened to the receptacle as a prepackaged unit. The prepackaged air bag unit maintains the air bag in a predetermined folded configuration (i) before the air bag is coupled to the receptacle, (ii) while the air bag is being coupled to the receptacle, (iii) while the remainder of the module is being assembled, and (iv) after the module is installed in a vehicle.

30 Claims, 9 Drawing Sheets

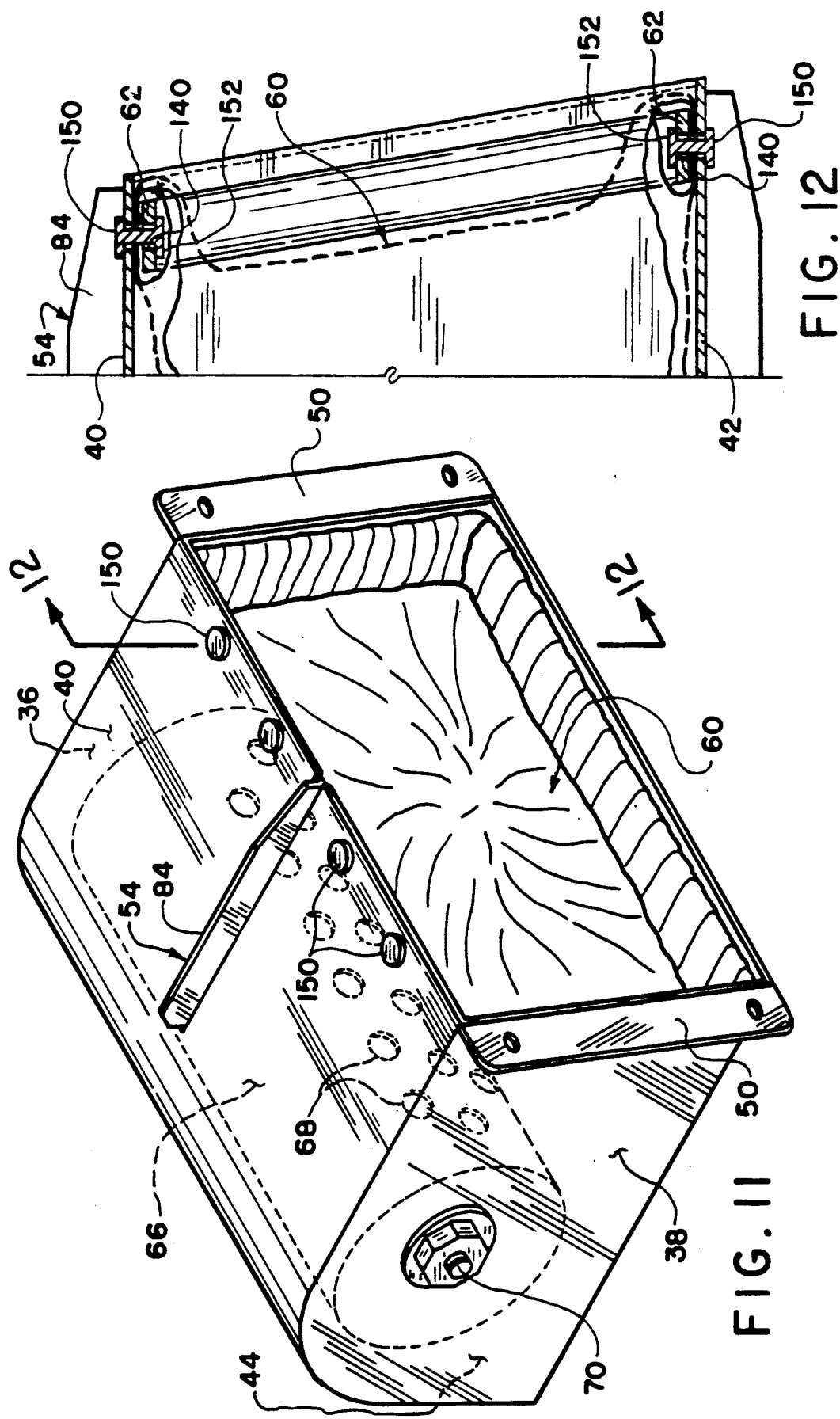

VEHICLE AIR BAG MODULE AND METHOD OF ASSEMBLY

FIELD OF THE INVENTION

The present invention relates to (i) a vehicle air bag module construction, (ii) certain components which are useful in forming an air bag module, and (iii) a method of assembling an air bag module.

BACKGROUND OF THE INVENTION

A typical vehicle air bag module comprises a folded air bag and an inflator which are disposed in a container. When the vehicle is involved in a collision, a crash signal initiates operation of the inflator. The inflator generates an inert gas (e.g., nitrogen) which forces the air bag out of the container and inflates the air bag. An air bag module is located in a vehicle so that the air bag, when forced out of the container, will cushion a vehicle occupant against impact with a structural part of the vehicle. One location for an air bag module is in the instrument panel or dashboard on the passenger side of the vehicle.

A known type of container for a passenger side air bag module comprises a receptacle with walls forming a closed end, an open end, and an internal cavity disposed between the closed and open ends. A cover covers the open end and closes the receptacle. The inflator and the folded air bag are located in the internal cavity and are coupled to respective portions of the receptacle. The cover is adapted to separate when pressure is applied to it. During an emergency, therefore, the air bag can be forced through the cover as the air bag is being inflated.

To assemble the module, the air bag and inflator are loaded into and coupled to the receptacle. The inflator is disposed adjacent the closed end of the receptacle, and the folded air bag located adjacent the open end of the receptacle. Thereafter, the cover is attached to the receptacle to complete the module.

After the module is assembled, it is installed as a unit into a vehicle. With a passenger side air bag module, the receptacle is located just behind the vehicle dashboard, and is fastened to a structural part of the vehicle. The cover has an outer surface profile that matches the outer profile of the dashboard. Due to the location of the receptacle, the cover is effectively incorporated into and forms a part of the vehicle dashboard.

During inflation of an air bag, the receptacle, which is generally made of metal (e.g., steel sheet), must withstand significant pressures. Specifically, a passenger side inflator, when actuated, is believed to produce gas pressure of approximately 30–50 psi in the container. It has been found that under such pressure, portions of the open end of the receptacle may tend to bulge outward or "fishmouth" during deployment of the air bag. When the container is located just behind the vehicle dashboard, fish-mouthing of the open end of the receptacle can crack (or deform) the dashboard. Such cracking or deformation will require replacement of the entire dashboard.

One known technique for resisting fish-mouthing of a metal air bag receptacle is to bend outward certain portions of the metal walls forming the open end of the receptacle outward. The walls are bent in the areas which are most prone to fish-mouthing. This technique increases the beam strength of those portions of the walls to resist fish-mouthing. Another technique for resisting fish-mouthing of an air bag receptacle is disclosed in U.S. Pat. No. 4,842,300 to Ziomek et al. In the Ziomek, et al. patent, a reaction member, preferably an inelastic fabric tether strap, extends across the open end of the receptacle. At its ends, the tether strap is connected to the portions of the walls of the receptacle most prone to fish-mouthing. The tether strap restrains those portions of the walls of the receptacle from bulging outward under the pressures of air bag deployment.

Applicants also believe that it is desirable physically to separate the air bag from the inflator within an air bag module. Such separation ensures that during assembly of the module and during normal operation of a vehicle, the inflator and the air bag do not interfere with each other. Moreover, during inflation of the air bag, the inflator becomes quite hot. Separation of the air bag from the inflator helps prevent the air bag from contacting and being burned by the inflator.

Still further, applicants believe that the receptacle, the air bag, and the other components which make up the module be designed for efficient and effective fabrication and assembly into the module, preferably by mass production techniques.

SUMMARY OF THE INVENTION

The present invention provides (i) several new and useful components for forming an air bag module, (ii) new and useful module constructions formed by such components, and (iii) new and useful techniques for forming an air bag module from such components. One of the new components comprises a receptacle with a specially designed reaction device. The reaction device can be efficiently and effectively fabricated and assembled with the receptacle. The reaction device is also adapted to separate the receptacle physically into distinct compartments for an inflator and an air bag. Further, the reaction device reinforces the open end of the receptacle in the areas most prone to fish-mouthing. Another new and useful component comprises a prepackaged air bag unit. The air bag unit is loaded into and fastened to the receptacle as a prepackaged unit. The prepackaged air bag unit maintains the air bag in a predetermined folded configuration (i) before the air bag is coupled to the receptacle, (ii) while the air bag is being coupled to the receptacle, (iii) while the remainder of the module is being assembled, and (iv) after the module is installed in a vehicle.

The receptacle has walls defining a front end, a rear end, and an internal cavity extending between the front and rear ends. The walls defining the front end form a front opening through which the air bag is forced during inflation of the air bag. The reaction device has a main body portion and a pair of reinforcement portions at the ends of the main body portion. When the reaction device is assembled with the receptacle, the main body portion is located inside the receptacle. The main body portion divides the receptacle into a front compartment adjacent the front end of the receptacle and a rear compartment adjacent the rear end of the receptacle. The reinforcement portions extend forward from the main body portion. The reinforcement portions reinforce walls of the receptacle forming the front opening, in the areas most vulnerable to fish-mouthing.

The reaction device and the receptacle are designed so that the reaction device may be efficiently assembled with the receptacle. Specifically, according to one embodiment of the invention, both reinforcement portions are formed in one piece with the main body portion. Certain walls of the receptacle have slots which enable the reaction device to be simply and efficiently slid into position in the receptacle. In another embodiment, one reinforcement portion and part of the other reinforcement portion are formed in one piece with the main body portion of the reaction device. A remaining part of the other reinforcement portion is adapted simultaneously to couple the reaction device to the receptacle and to complete the reaction device. Both embodiments are designed to enable the reaction device and the receptacle to be efficiently assembled with each other, by mass production techniques.

In assembling a module, an inflator is loaded into the rear compartment of the receptacle. The prepackaged air bag is loaded into the front compartment of the receptacle. The main body portion of the reaction device is designed to maintain the air bag and inflator physically separated from each other during assembly of the module, and also during inflation of the air bag. This separation is desirable to help minimize the likelihood of the prepackaged air bag unit contacting the inflator during (i) assembly of the module, (ii) normal operation of a vehicle incorporating the module, and (iii) inflation of the air bag.

The prepackaged air bag unit comprises (i) an air bag in a predetermined folded configuration, (ii) retainer structure which is connected with a portion of the folded air bag and which is adapted to be coupled with the receptacle, and (iii) packaging material closely surrounding the air bag and maintaining the air bag in its predetermined folded configuration. The retainer structure enables the prepackaged air bag unit (and the appropriate portion of the air bag) to be efficiently and securely coupled to the receptacle during assembly of the module. Different types of retainer structure and different techniques for coupling the prepackaged air bag with the receptacle can be used. At least one type of retainer structure would enable the prepackaged air bag unit to be coupled to an air bag receptacle without the special reaction device of the preferred embodiment and still provide reinforcement against fish-mouthing of the receptacle.

Further features of the present invention will become apparent from the following detailed description and the accompanying drawings.

BRIEF DESCRIPTION OF THE DRAWINGS

FIG. 11 is a schematic, perspective view of the air bag receptacle and reaction device of FIG. 1, with a prepackaged air bag unit and an inflator loaded in the receptacle;

FIG. 12 is a fragmentary sectional view of the structure of FIG. 11, taken along the line 12—12;

DETAILED DESCRIPTION OF THE PREFERRED EMBODIMENTS

Figure 2:
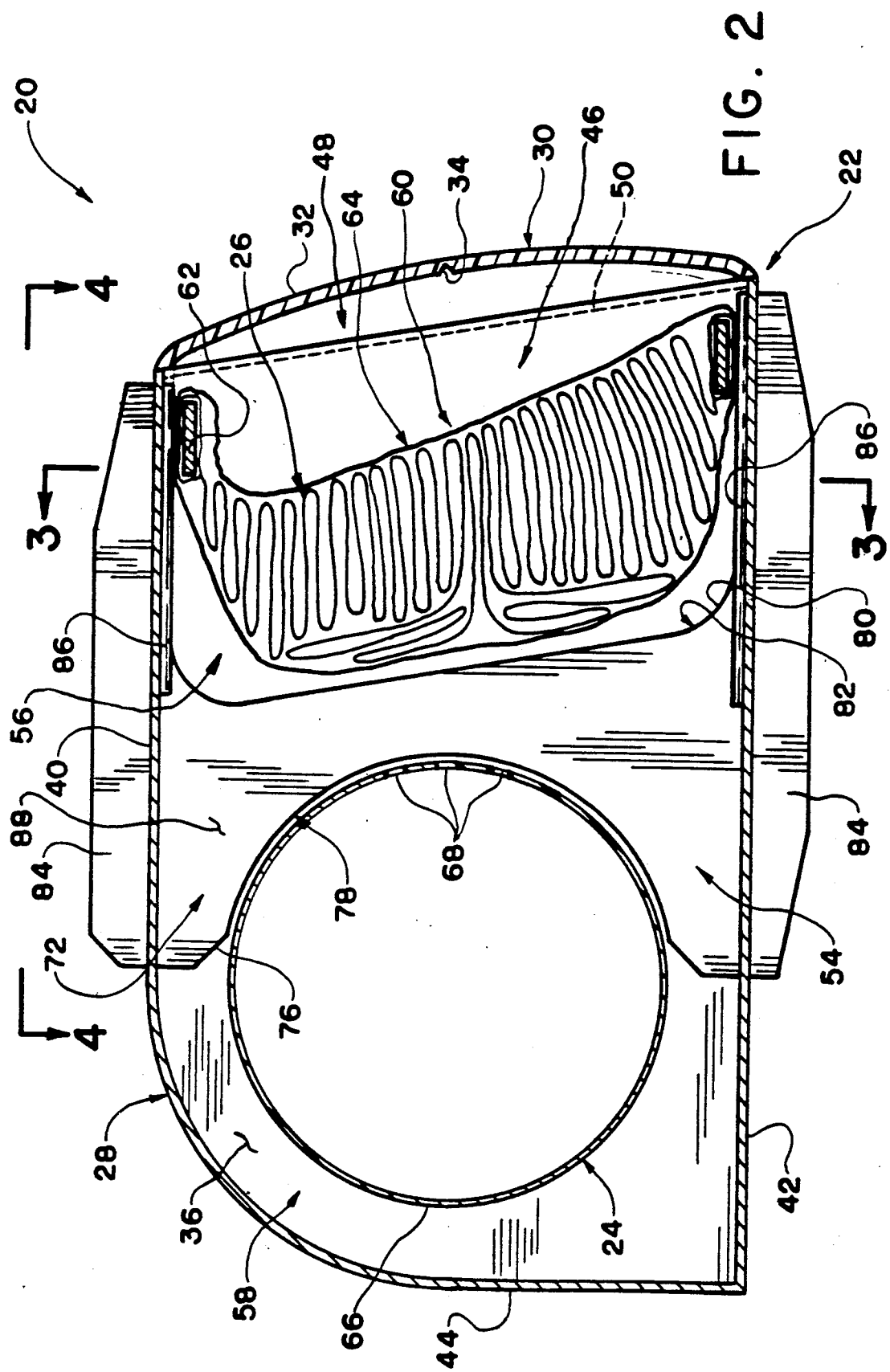
FIG. 2 is a schematic sectional view of an air bag module constructed according to the present invention, with certain portions omitted.

FIG. 2 illustrates a passenger side air bag module 20 constructed according to the present invention. The air bag module 20 includes a container 22 in which an inflator 24 and an air bag 26 are located. The container 22 comprises a receptacle 28 and a cover 30 coupled to the receptacle.

When the module 20 is incorporated into a vehicle, the receptacle 28 is located just behind the vehicle dashboard. The cover 30 has an outer surface 32 (FIG. 2) with a profile matching the outer profile of the vehicle dashboard. Thus, when the air bag module 20 is coupled with a vehicle, the cover 30 of the module is effectively incorporated into and forms a part of the vehicle dashboard.

The cover 30 has a designed weakness, such as V-shaped grooves 34 (FIG. 2), to enable the cover 30 to separate into segments during deployment of the air bag 26 from the module. Preferably, the cover 30 is constructed in accordance with the teachings of U.S. Pat. No. 3,622,176. Specifically, the cover 30 comprises a flexible plastic member with the V-shaped grooves 34 formed in a predetermined configuration. The configuration of the grooves enables the cover 30 to separate into a pair of flaps when pressure is applied to the inside of the cover during deployment of the air bag 26 from the module.

The receptacle 28 includes a pair of spaced apart, parallel side walls 36, 38, a top wall 40, a bottom wall 42, and an end wall 44 (see FIGS. 1-4). Together these walls form an internal cavity 46 with a rectangular front opening 48 (FIG. 1) located opposite the end wall 44. A pair of side flanges 50 (FIG. 1) extend transverse to the side walls 36, 38 adjacent the front opening 48. The side flanges 50 have holes 52 which enable the cover 30 to be bolted, riveted or otherwise fastened to the receptacle 28. The receptacle 28 has fastening structure (not shown) enabling the receptacle 28 (and thereby the module 20) to be coupled to a portion of a vehicle. An example of suitable fastening structure is shown in U.S. Pat. No. 4,842,300. Various other types of suitable fastening structure are known to those of ordinary skill in the air bag art, and should require no further description.

A reaction device 54, described in more detail below, is coupled to the receptacle 28. The reaction device 54 separates the receptacle 28 into front and rear compartments 56, 58 for the air bag 26 and the inflator 24, respectively. The reaction device 54 also reinforces the receptacle 28 in a way which resists fish-mouthing of the receptacle 28 during deployment of the air bag 26.

The air bag 26 is incorporated into a prepackaged air bag unit 60 (FIGS. 2, 9–12). The prepackaged air bag unit 60 comprises the air bag 26, a retainer device 62, and packaging 64. The air bag 26 is folded into a predetermined configuration. The retainer device 62 is incorporated into a portion of the air bag 26 and enables the prepackaged air bag unit 60 (and the air bag 26) to be coupled in force transmitting relationship to the receptacle 28. The packaging 64 substantially surrounds the folded air bag 26 and retainer device 62. The prepackaged air bag unit 60 is adapted to be located in the front compartment 56 of the receptacle 28. The unit 62 is also adapted to be coupled to the top and bottom walls 40, 42 forming the front opening 48 in the receptacle 28, as described more fully hereinafter.

Figure 1:
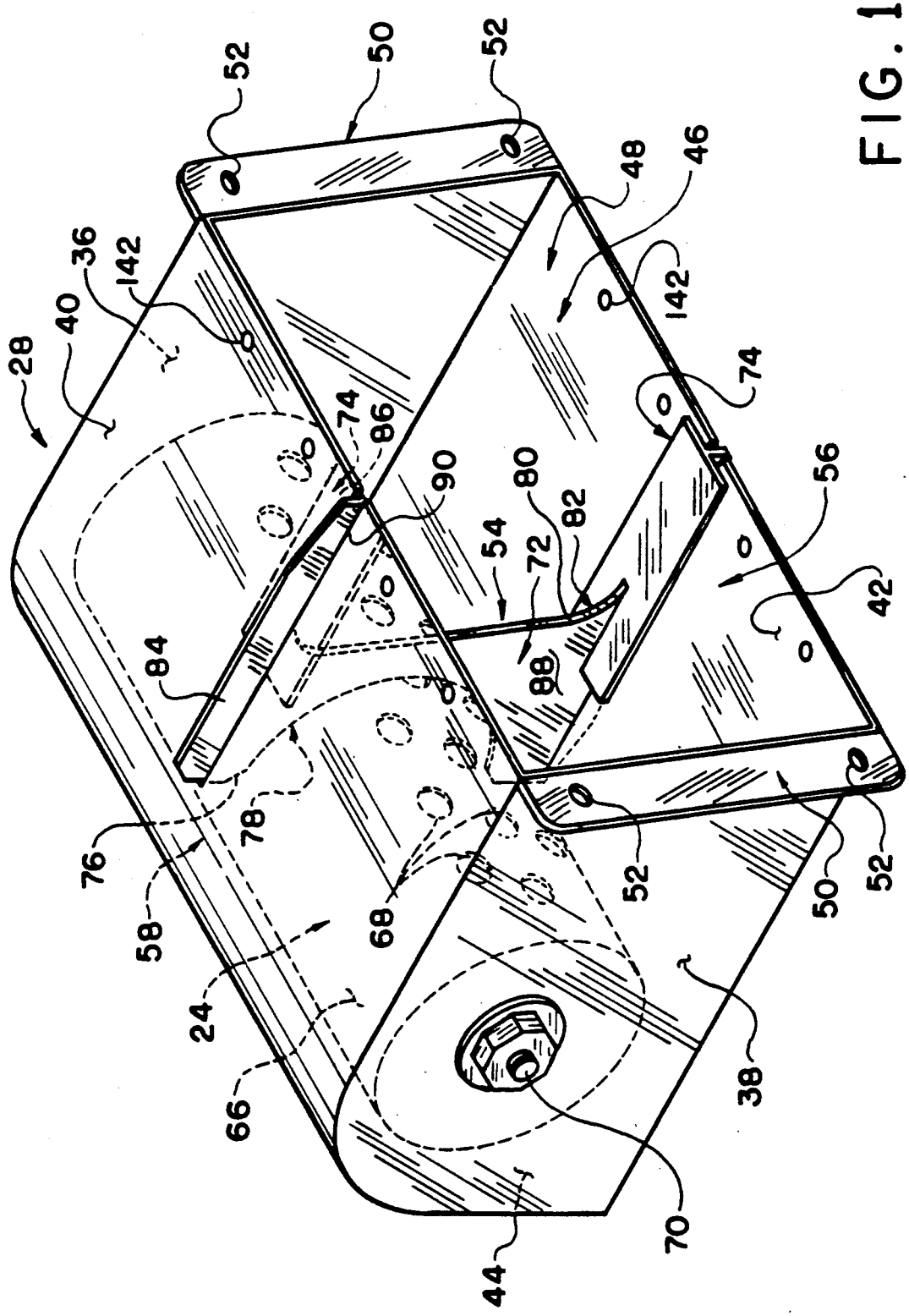
FIG. 1 is a perspective view of an air bag receptacle and reaction device constructed according to the present invention with an inflator located in the receptacle.
Figure 3:
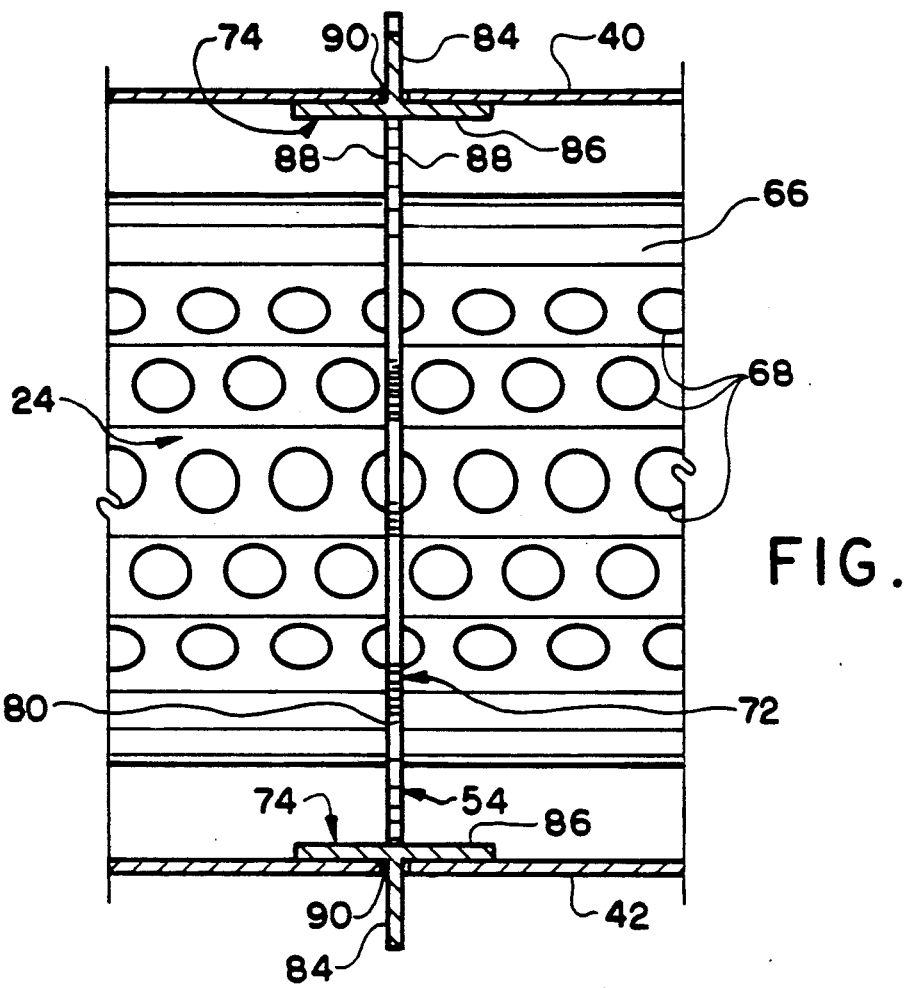
FIG. 3 is a sectional view of a portion of the module of FIG. 2, taken along the line 3—3, with portions omitted.
Figure 4:
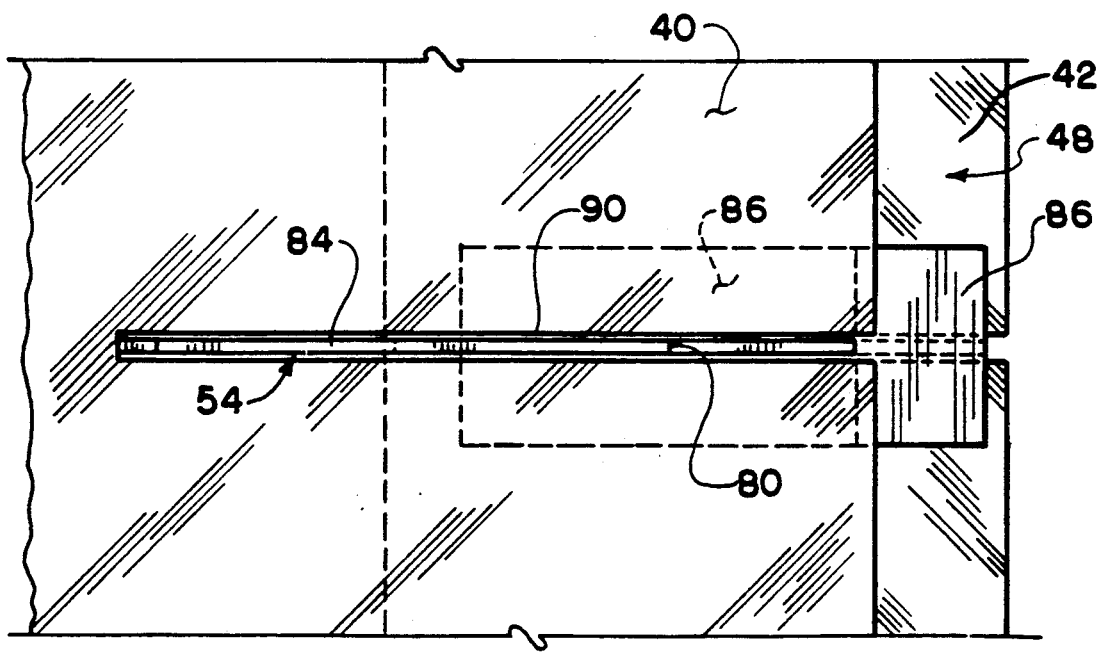
FIG. 4 is a top view of a portion of the module of FIG. 2, taken from the direction 4—4.
Figure 5:
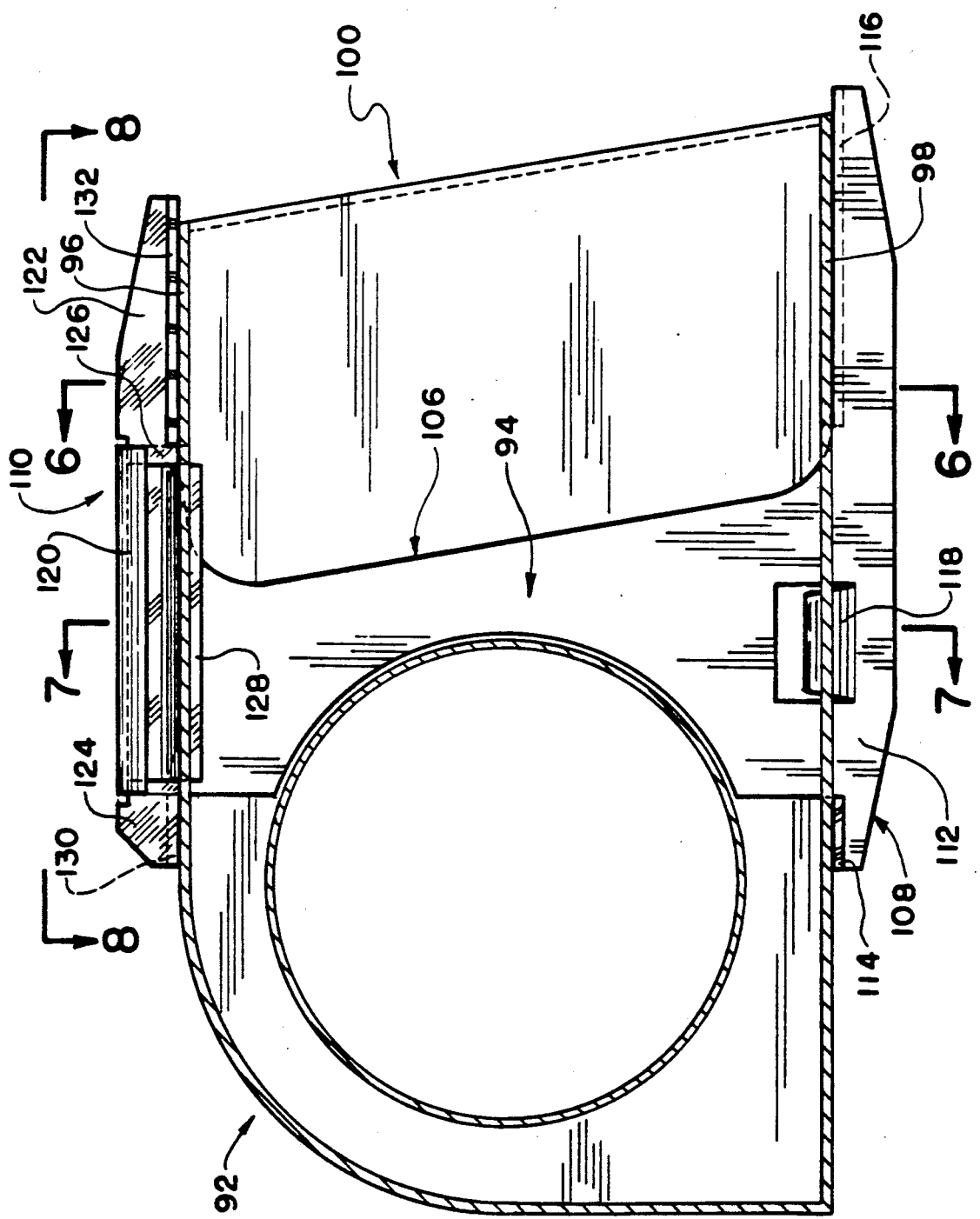
FIG. 5 is a sectional view of a modified form of receptacle and reaction device constructed according to the principles of the present invention.
Figure 7:
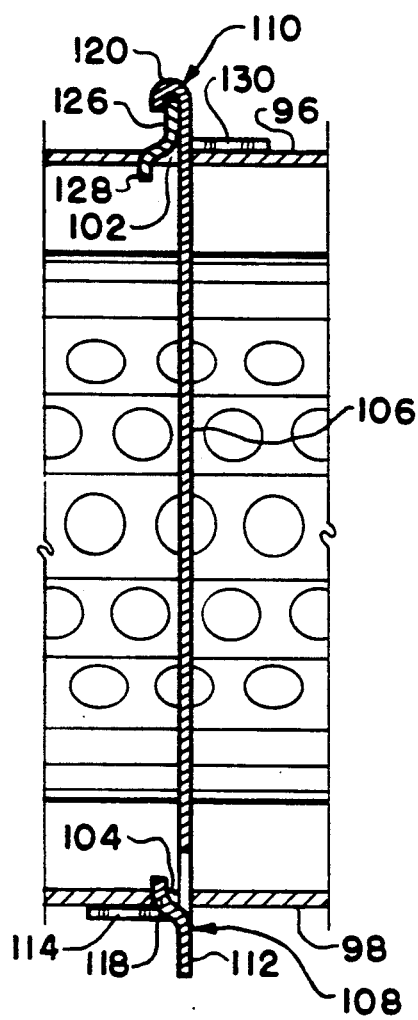
FIG. 7 is a sectional view of the receptacle and reaction device of FIG. 5, taken from the direction 7—7.
Figure 6:
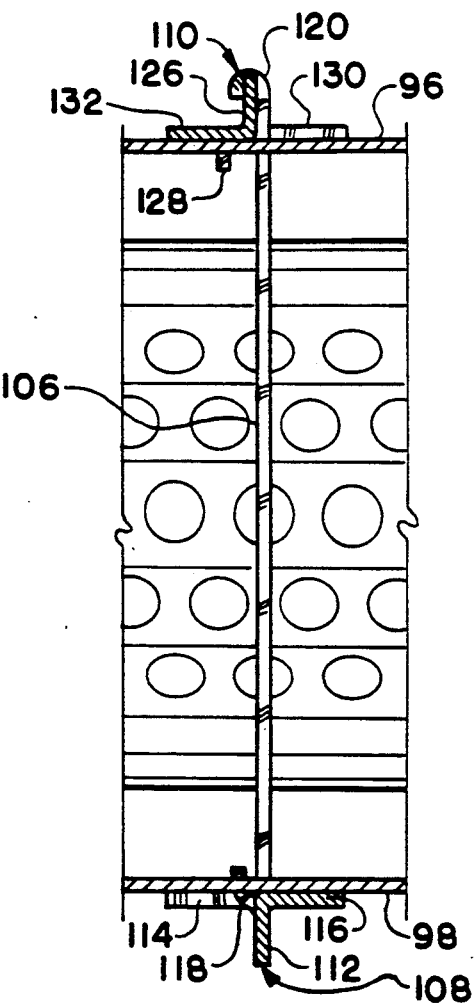
FIG. 6 is a sectional view of the receptacle and reaction device of FIG. 5, taken from the direction 6—6.
Figure 8:
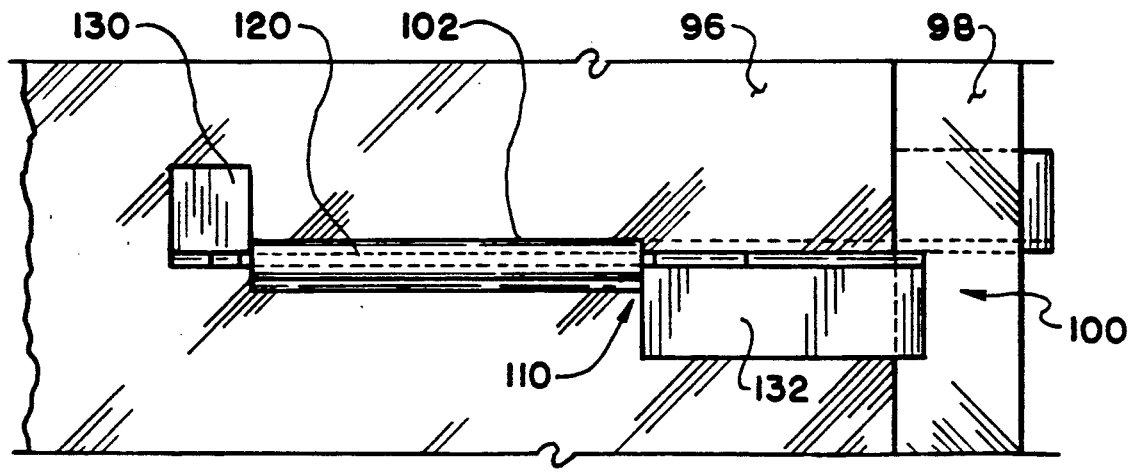
FIG. 8 is a top view of the receptacle and reaction device of FIG. 5, taken from the direction 8—8.

The inflator 24 has a cylindrical outer housing 66 in which a plurality of nozzles 68 are formed (see e.g., FIGS. 1-3). In an emergency condition, an inert gas (e.g., nitrogen) is generated within the inflator housing 66. The gas is directed rapidly through the nozzles 68 and into the air bag 26, to force the air bag 26 out of the container 22 and to inflate the air bag 26. The inert gas is generated by ignition of a solid chemical mixture disposed within the inflator housing 66. The internal structure of the inflator can be any of a number of known constructions, including the construction illustrated in U.S. Pat. No. 4,696,705, which is a preferred construction. The inflator can also or alternatively include a container of pressurized gas that is released in an emergency situation.

The inflator 24 is inserted into the rear compartment 58 of the receptacle 28 through a hole (not shown) in the side wall 36. One end of the inflator 24 has a threaded shaft 70 which enables the inflator 24 to be bolted to the opposite side wall 38 (see FIGS. 1, 11). The other end of the inflator 24 is adapted to be bolted, riveted, or otherwise fastened to an end cap (not shown). The end cap closes the hole formed in the side wall 36 after the inflator 24 has been inserted into the receptacle 28. Such structure is well known to those of ordinary skill in the air bag art. As is also well known to those in the air bag art, the inflator 24 may have a locator boss (not shown) designed to be received in a recess in the end wall 44 or in a member (not shown) fixed to the end wall 44. The boss and recess would help to ensure that the inflator 24 is properly located in the rear compartment 58 (i.e., with its nozzles 68 facing the air bag 26).

In the embodiment of FIGS. 1-4, the reaction device 54 comprises a planar main body portion 72 and reinforcement structure 74 at each end of the main body portion 72. The plane of the main body portion 72 is generally parallel to the side walls 36, 38. The rear edge 76 of the planar main body portion 72 defines an arcuate recess 78 facing the end wall 44 of the receptacle 28. The arcuate recess 78 defines part of the rear compartment 58 and forms a cradle for the inflator housing 66. The front edge 80 of the planar main body portion 72 defines a recess 82 which is spaced from and faces the front opening 48 in the receptacle 28. The recess 82 forms a cradle for the prepackaged air bag unit 60 (see FIG. 2).

The reinforcement structure 74 at each end of the main body portion 72 comprises a tongue 84 and a transverse flange 86. Each tongue 84 comprises a planar extension of the planar main body portion 72. Each transverse flange 86 is planar, and extends perpendicular to the main body portion 72. Moreover, each transverse flange 86 extends away from both major sides 88 of the planar main body portion 72 (see FIG. 3). Still further, each transverse flange 86 extends a substantial distance forward of the front edge 80 of the main body portion 72 (see FIGS. 1,2).

Each of the top and bottom walls 40, 42 has a slot 90 formed adjacent the front opening 48 and extending a predetermined distance rearward from the front opening 48. The slots 90 are aligned with each other and are parallel to the side walls 36, 38. The slots 90 are centrally located in the top and bottom walls 42, 44. Moreover, each slot 90 is designed to receive the tongue 84 at a respective end of the main body portion 72. When both of the tongues 84 are located in the slots 90, the transverse flanges 86 at the ends of the main body portion 72 are disposed immediately adjacent the inside surfaces of the top and bottom walls 40, 42 of the receptacle 28.

The reaction device 54 can be attached to the receptacle 28 by sliding the tongues 84 in the slots 90 to locate the tongues 84 at the rear ends of the slots 90. In that position, the main body portion 72 of the reaction member is located about midway between the front and rear ends of the receptacle 28, and divides the receptacle into the front and rear compartments 56, 58. The transverse flanges 86 are located against the inside surfaces of the top and bottom walls 40, 42 and extend forward from the main body portion 72 to the front opening 48. Moreover, the flanges 86 are located at central portions of the top and bottom walls 40, 42. Thus, the transverse flanges 86 reinforce the central portions of the top and bottom walls 40, 42. When secured to the top and bottom walls 40, 42, the flanges 86 resist separation of the top and bottom walls, and thereby resist fish-mouthing of the front opening 48 of the receptacle 28.

The reaction device 54 is preferably formed of a relatively strong material such as sheet steel. The receptacle 28 may also be formed of sheet steel. However, the reaction device 54 alone may provide sufficient structural resistance to fish-mouthing of the receptacle to enable the receptacle to be formed of lighter weight materials (e.g. thinner and lighter weight metals, or plastics). When the reaction device 54 has been slid into position relative to the receptacle 28, the reaction device 54 may be fixed to the receptacle by various means (e.g., by welding when the receptacle is formed of metal, or by adhesive if the receptacle were formed of plastic).

The reaction device 54 and the receptacle 28 of FIGS. 1–4 are readily adaptable to being assembled by mass production techniques. Specifically, reaction devices can be assembled with receptacles by sliding the reaction devices into respective receptacles. Thereafter, the reaction devices can be fixed to their respective receptacles by welding, adhesive, etc. Both of the foregoing steps can be performed along a single assembly line. Moreover, it is believed possible to automate the steps of assembling reaction devices with receptacles, and fixing the reaction devices to the receptacles.

A modified receptacle 92 and a modified reaction device 94 are shown in FIGS. 5-8. The modified reaction device 94 comprises two pieces which are coupled to each other and to the modified receptacle 92 in a way which simultaneously forms the reaction device 94 and couples the reaction device to the receptacle 92.

The receptacle 92 has top and bottom walls 96, 98, respectively, partially defining a front opening 100 in the receptacle. A slot 102 is formed in the top wall 96 and a slot 104 is formed in the bottom wall 98. The slots 102, 104 are shorter and wider than the slots of the previous embodiment. Moreover, the slots 102, 104 do not extend to the front opening formed in the receptacle 92.

The reaction device 94 comprises a planar main body portion 106 and a lower reinforcement structure 108 formed in one piece with the main body portion 106. The reaction device 94 also comprises a reinforcement/coupling member 110 which co-operates with structure at the top end of the main body portion 106 simultaneously to complete the reaction device 94 and to couple the reaction device 94 to the receptacle 92. When the reaction device 94 is coupled to the receptacle 92, the main body portion 106 divides the receptacle 92 into front and rear compartments in a manner similar to the previous embodiment. The lower reinforcement structure 108 and the reinforcement/coupling member 110 reinforce the central portions of the top and bottom walls 96, 98. This reinforcement prevents fish-mouthing of the front opening 100 of the receptacle 92.

The lower reinforcement structure 108 comprises (i) a tongue 112 which is co-planar with the main body portion 106, and (ii) two transverse, planar flanges 114, 116 extending perpendicular to the main body portion 106. The transverse, planar flange 114 extends rearward from the main body portion 106. The transverse, planar flange 116 extends forward from the main body portion 106 to the edge of the bottom wall 98 which partially defines the front opening 100 of the receptacle 92. The transverse, planar flange 116 is adapted to lie against the outer surface of the bottom wall 98 of the receptacle 92. A locking tab 118 is formed in one piece with the tongue 112 at the lower end of the main body portion 106 and projects out of the plane of the tongue 118.

A hook-shaped tongue 120 is formed in the upper end of the main body portion 106. The hook-shaped tongue 120 co-operates with the reinforcement/coupling member 110 to complete the reaction device and to couple the reaction device to the receptacle 92.

The reinforcement/coupling member 110 comprises co-planar front, rear and intermediate portions 122, 124, 126, respectively. A locking tab 128 is formed in one piece with the intermediate planar portion 126. A planar, transverse rear flange 130 is formed in one piece with the rear planar portion 124. Similarly a planar, transverse front flange 132 is formed in one piece with the front planar portion 122. The locking tab 128 projects out of the plane of the coplanar front, rear and intermediate portions 122, 124, 126. Portions of the locking tab 128 may have inclined ramps (not shown), for purposes which will be readily apparent below.

To assemble the reaction device 94 with the receptacle 92, the main body portion 106 is inserted into and through the slot 104 in the bottom wall 98. The slot 104 is long enough and wide enough to enable the main body portion 106 and to allow the hook-shaped tongue 120 to pass through. The main body portion 106 is inserted into the receptacle 92 until the hook-shaped tongue 120 extends through the slot 102 in the top wall 96. The slot 102 in the top wall 96 is long enough and wide enough to allow the hook-shaped tongue 120 to pass through the slot. When the tongue 120 extends sufficiently through the slot 102, the flanges 114 and 116 abut the bottom wall 98 of the receptacle 92. In addition, the locking tab 118 at the bottom of the main body portion 106 moves into the slot 104 in the bottom wall 98 of the receptacle 92. The lateral projection of the locking tab 118 is slightly greater than the width of the slot 104. The locking tab 118 also has some resilience. Thus, the locking tab is resiliently compressed by the edges of the bottom wall 98 which define the slot 118 and exerts a retaining force against the wall edges.

Thereafter, the reinforcement/coupling member 110 is coupled with the hook-shaped tongue 120 and with the top wall 96. Specifically, the slot 102 in the top wall 96 is wide enough so that the intermediate portion 126 of the reinforcement/coupling member 110 can be manipulated into engagement with the hook-shaped tongue 120 and the locking tab 128 can be resiliently engaged in the slot 102 in the top wall 96. The lateral projection of the locking tab 128 is slightly greater than the width of the slot 102, to permit such resilient engagement of the tab 128 with the edges of the bottom wall 28 which define the slot 102. The locking tab 128 may have an inclined ramp, if necessary, to initiate resilient engagement of the locking tab 128 with the wall edges defining the slot 102.

As the locking tab 128 is resiliently engaged in the slot 102, the components of the reaction device 94 are brought into the alignment shown in FIGS. 5-8. In that alignment, the reaction device is completed and coupled to the receptacle 82. The transverse, front flange 132 on the reinforcement/coupling member 110 extends forward from the main body portion 106 to the front opening 100 in the receptacle 92. The flange 132 also lies against the outer surface of the top wall 96 of the receptacle. Thus, the flanges 132, 116 along the top and bottom walls 96, 98 reinforce the central portions of the top and bottom walls to prevent fish-mouthing of the receptacle. Additionally, the flanges 130, 114 also serve to reinforce the top and bottom walls 96, 98 spaced from the front opening 100. Moreover, the structure securely couples the reaction device to the receptacle without the need for welds, adhesive or other additional fastening means.

After a reaction device is assembled with a receptacle, by either of the foregoing techniques, a prepackaged air bag and an inflator are loaded into the receptacle. The inflator is loaded into the rear compartment formed by the receptacle and the reaction device and is coupled to the receptacle, in the manner described above. The prepackaged air bag unit is loaded into the front compartment and coupled to the receptacle, as set forth below. The order in which the inflator and prepackaged air bag unit are loaded into the receptacle is not important. Thus, the prepackaged air bag unit could be loaded into the receptacle to form a subassembly, and the inflator could be later assembled with the subassembly as the module is being completed.

Figure 9:
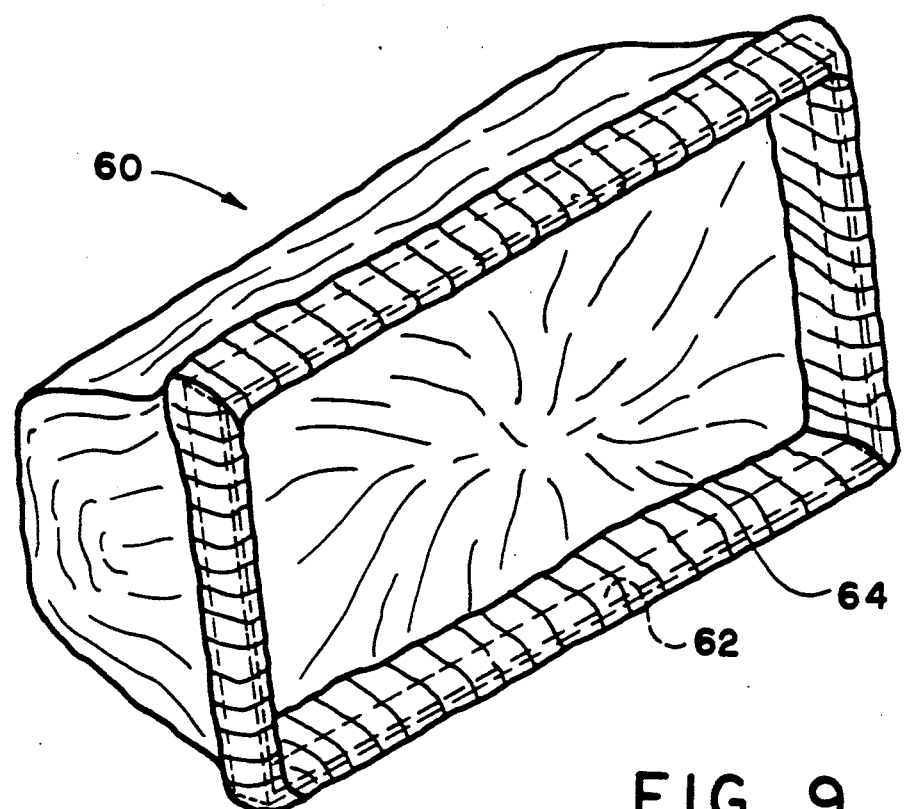
FIG. 9 is a schematic, perspective view of a prepackaged air bag unit constructed in accordance with the principles of this invention.
Figure 10:
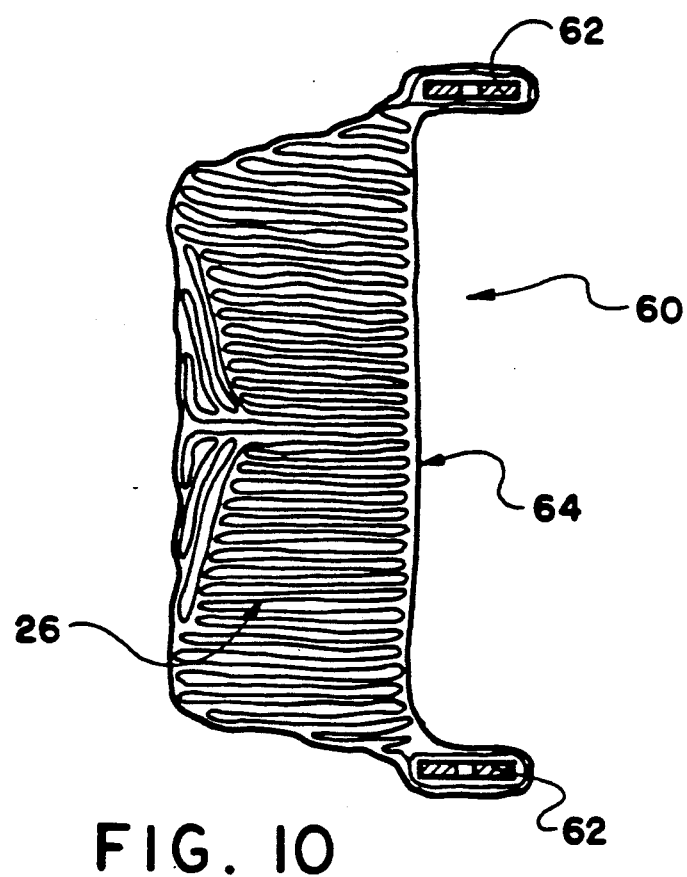
FIG. 10 is a schematic three-dimensional cross sectional view of the prepackaged air bag unit of FIG. 1, with the packaging material shown surrounding the air bag unit.

A preferred form of the prepackaged air bag unit 60 is shown in FIGS. 9 and 10. The prepackaged air bag unit 60 includes the folded air bag 26, the retainer device 62 which is incorporated into the air bag, and the packaging 64 surrounding the air bag 26 and the retainer device 62.

The air bag 26 is formed of a strong, synthetic fabric, such as nylon, and is folded into a predetermined configuration. The predetermined configuration is shaped to fit conveniently into the front compartment and is designed for efficient deployment of the air bag from the module 20.

The retainer device 62 comprises relatively rigid, metal structure incorporated into the "mouth" of the air bag 26 (i.e., the portion of the air bag which forms a gas inlet opening in the air bag). The retainer device is used to secure the mouth of the air bag 26 to the front opening of the receptacle. The retainer device 62 is preferably a continuous frame which is retained in a tubular channel formed by the air bag material at the mouth of the air bag. The retainer device 62 may be adapted to attach to the air bag receptacle by several techniques, as described below.

After the retainer device 62 is incorporated into the air bag, the air bag is folded into its predetermined configuration. The packaging 64 is then wrapped and drawn tightly around the folded air bag to form the prepackaged air bag unit 60. As the packaging 64 is being wrapped about the folded air bag 26, the folded air bag may be compressed or vacuum packed to a predetermined minimum volume. The air bag is maintained in that prepacked, minimum volume the packaging 64. The packaging material is selected (or constructed) so that it is capable of maintaining the air bag 26 in its prepackaged condition, but can easily tear or separate when the air bag is being deployed from the receptacle. The packaging material is tightly drawn about the prefolded air bag by techniques such as vacuum forming, blister pack packaging techniques, or shrink-wrap packaging techniques. The packaging material is maintained tightly wrapped about the compressed air bag by the foregoing techniques alone, or by means of banding structure such as tape, string, or Velcro straps.

As discussed above, there are various techniques contemplated for attaching the prepackaged air bag unit in the opening in the receptacle. One technique is to use rivets. Specifically, the continuous frame retainer device 62 on the inside of the prepackaged air bag unit includes a series of holes 140 (FIG. 12) spaced about the device. The receptacle includes aligned openings 142 in its top, bottom and side walls adjacent the front opening of the receptacle (see e.g., FIG. 1). Rivets 150 (FIGS. 11, 12) attach the retainer device 62 to the walls of the receptacle adjacent the front opening. The rivets 150 are inserted through the holes 140 in the retainer device 62, as is known, the internal heads 152 of the rivets are upset so as to lock the retainer device 62 (and the mouth of the air bag) to the walls of the receptacle. One advantage of a retainer device in the form of a continuous frame is that relatively few rivets are required to secure the continuous frame to the receptacle. Moreover, a continuous frame can be designed with rounded corners to reduce the risk of the air bag tearing at the corners.

Figure 13:
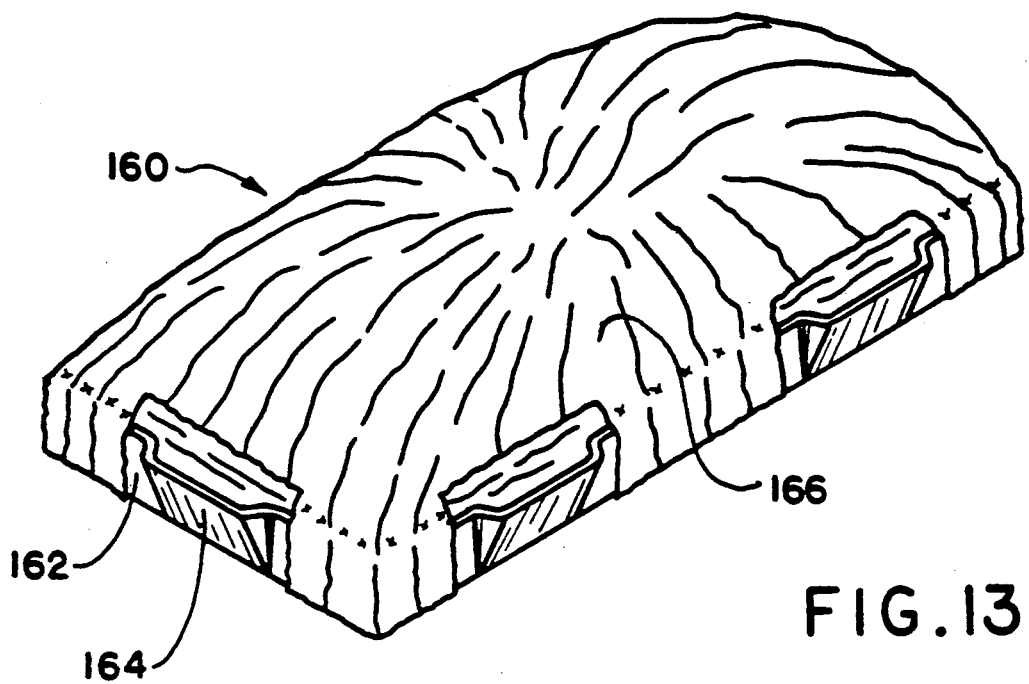
FIG. 13 is a schematic three dimensional illustration of a prepackaged air bag according to a modified form of the present invention.
Figure 14:
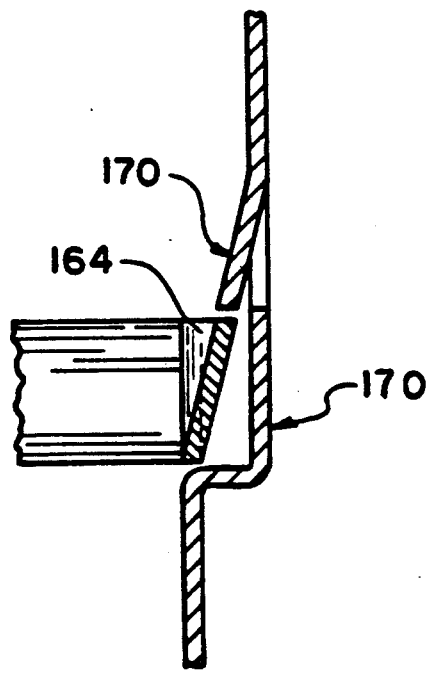
FIG. 14 is a fragmentary schematic illustration of the manner in which the prepackaged air bag unit of FIG. 13 can be attached to a receptacle.

Another form of prepackaged air bag unit 160 is shown in FIGS. 13 and 14. The prepackaged air bag unit 160 has a retainer device 162 which is a continuous frame. Formed in the frame is a series of inclined, locking wedges 164. The locking wedges 164 are designed to project slightly out of the tubular channel at the mouth of the air bag and out of the packaging material 166 for the prepackaged air bag unit 160. The receptacle has walls from which mating locking wedges 170 project (see FIG. 14). The prepackaged air bag unit 160 is designed to be attached to the receptacle by pressing the locking wedges 164 on the prepackaged air bag unit 160 and the locking wedges 170 on the receptacle into engagement with each other. Alternatively, the retainer device and the receptacle could be provided with other configurations for respective locking members adapted to be press-fit with each other to couple the prepackaged air bag unit to a receptacle.

Figure 15:
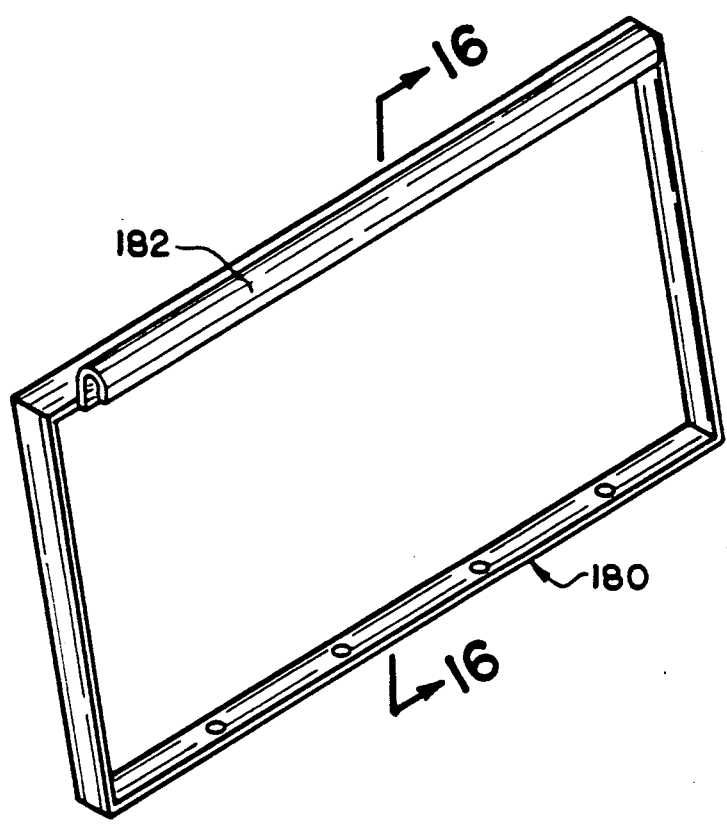
FIG. 15 is a perspective view of a modified retainer member which can be incorporated into a prepackaged air bag unit, according to the principles of the present invention.
Figure 16:
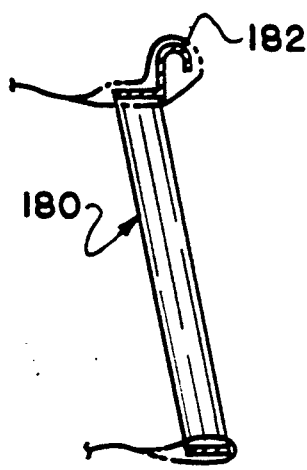
FIG. 16 is a sectional view of the retainer member of FIG. 15, taken from the direction 16—16.

Still another form of a retainer device for incorporation into a prepackaged air bag unit is shown in FIGS. 15 and 16. The retainer device includes a continuous rectangular frame 180. At least one reinforcing wall portion 182 is formed in one piece with the frame 180. The reinforcing wall portion 182 provides added beam strength to a wall of the receptacle when a prepackaged air bag unit with the retainer device is incorporated into an air bag module. The added beam strength reinforces the wall against deformation. A prepackaged air bag unit with such a retainer device could be used with reinforced receptacles according to the preferred embodiment of the invention, such a unit may also provide sufficient reinforcement to enable it to be used with receptacles which do not have the special reinforcement of the preferred embodiments.

Accordingly, applicants have disclosed above several new and useful preferred techniques and structures for forming air bag modules and components thereof. Moreover, it is believed the techniques and the structures can be used with module designs and components formed by other than the preferred structures. For example, the preferred form of receptacle has a rear compartment closed by an end wall. However, it should be readily apparent that a receptacle with an open or partially open rear end (e.g., for aspiration purposes) could be readily divided into compartments and reinforced by the structures and techniques disclosed above. With the foregoing disclosure in mind, it is believed that various other modifications of the structures disclosed above will become apparent to those of ordinary skill in this art.

We claim:

1. Apparatus comprising a receptacle and a reaction device assembled therewith for use in forming a vehicle air bag module, said receptacle comprising wall means for defining a cavity for an inflator and at least part of a vehicle air bag, said wall means defining an opening for deployment of the vehicle air bag from said cavity, said reaction device including a portion located partly within said cavity and dividing said cavity into a first compartment for an inflator and a second compartment for a vehicle air bag, and said reaction device further including reinforcement structure for said wall means adjacent a selected portion of said opening to resist deformation of said selected portion of said opening as an air bag is being deployed from said cavity.

2. Apparatus as defined in claim 1, wherein said wall means comprises a pair of spaced apart walls partially defining said opening, said reinforcement structure connected with selected portions of each of said spaced apart walls adjacent said opening, said reinforcement structure being adapted to resist separation of said selected portions of said spaced apart walls as an air bag is being deployed from said cavity.

3. Apparatus as defined in claim 2, wherein each of said walls has a respective slot formed therein, said reaction device comprising a main body extending between said spaced apart walls and said reinforcement structure being located at each end of said main body portion, said reinforcement structure at each end of said main body comprising a tongue extending through a respective slot in one of said walls and a flange located against a portion of said one of said walls adjacent said opening, the flanges associated with the ends of said main body portion resisting separation of the central portions of said pair of spaced apart walls when forces on said pair of spaced apart walls are applied in directions tending to separate said pair of spaced apart walls, thereby to resist separation of said pair of spaced apart walls under the pressures generated as an air bag is being deployed from said cavity.

4. Apparatus as defined in claim 3, wherein said main body portion of said reaction device comprises a substantially planar member, said pair of spaced apart walls comprising substantially planar walls disposed parallel to each other, said substantially planar main body member extending transverse to said planar walls, said substantially planar member having opposite edge portions which partially define said first and second compartments, respectively.

5. Apparatus as defined in claim 4, wherein said tongue at each end of said reaction device comprises a substantially co-planar extension of said main body portion, the flange associated with at least one end of said main body portion comprising a substantially planar member integral with and extending substantially perpendicular to said main body portion.

6. Apparatus as defined in claim 5, wherein the flange associated with the other end of said main body portion is integrally formed on a reinforcement/coupling member which completes the reaction device and couples the reaction device to said receptacle.

7. Apparatus as defined in claim 5, wherein each of said slots in said pair of spaced apart walls intersects an edge of its respective wall adjacent said opening and extends a predetermined distance away from said opening.

8. Apparatus as set forth in claim 1, wherein reaction device comprises a member which has said reinforcement structure integrally formed in one piece with said member.

9. Apparatus as set forth in claim 1, wherein said reaction device comprises a pair of members which are coupled to each other and to the receptacle.

10. Apparatus comprising a prepackaged air bag unit for disposition in a vehicle air bag container, said prepackaged air bag unit comprising:
a flexible air bag in a predetermined folded configuration and
packaging substantially enclosing said air bag and maintaining said air bag in said predetermined folded configuration,
said prepackaged air bag unit being adapted to be coupled to said vehicle air bag container in a manner which places a selected portion of said air bag in force transmitting relationship with said vehicle air bag container.

11. Apparatus as set forth in claim 10, wherein said packaging comprises packaging material wrapped tightly about said folded air bag, and maintaining said packaging material wrapped tightly about said folded air bag to maintain said folded air bag in said predetermined folded configuration.

12. Apparatus as defined in claim 11, wherein said prepackaged air bag unit also comprises a retainer structure, said retainer structure being incorporated into a selected portion of said air bag, said retainer structure being adapted to be coupled to a vehicle air bag container in a manner which places the retainer structure and said selected portion of said air bag in force transmitting relation with the vehicle air bag container.

13. Apparatus as set forth in claim 12, wherein said retainer structure comprises a continuous frame incorporated into said air bag.

14. Apparatus as set forth in claim 13, wherein said continuous frame is adapted to be riveted to a vehicle air bag container.

15. Apparatus as set forth in claim 12, wherein said continuous frame has integrally formed locking structure adapted to be pressed into engagement with mating locking structure on a vehicle air bag container to couple said continuous frame with the vehicle air bag container.

16. Apparatus as set forth in claim 15, wherein said continuous frame has a plurality of wedge-shaped locking members integrally formed therewith, each of said plurality of wedge-shaped locking members being adapted to engage a mating wedge-shaped receptacle on a vehicle air bag container in a manner which connects said prepackaged air bag unit with the container and places the retainer structure and the selected portion of the air bag in force transmitting relation with the container.

17. Apparatus as defined in any of claims 13-16, wherein said continuous frame is shaped to correspond substantially to the shape of an air bag deployment opening in an air bag container.

18. A method of assembling a vehicle air bag module, including the steps of providing a container with a cavity for an inflator and at least part of a vehicle air bag, providing a prepackaged air bag unit with an air bag folded and compressed in a predetermined folded configuration and packaging substantially enclosing the folded air bag and maintaining the air bag in the predetermined folded configuration, and attaching said prepackaged air bag unit to said container.

19. A method as set forth in claim 18, wherein the step of attaching said prepackaged air bag unit to said container comprises attaching a plurality of fasteners to said prepackaged air bag unit and said container.

20. A method as set forth in claim 19, wherein the step of providing a prepackaged air bag unit includes the step of incorporating a continuous frame retainer into a selected portion of said air bag, and said step of attaching said plurality of fasteners to said prepackaged air bag unit and said container comprises the step of riveting selected portions of said continuous frame to said container.

21. A method as set forth in claim 18, wherein said container has a plurality of wedge-shaped locking receptacles and said prepackaged air bag unit has a plurality of wedge-shaped fasteners, said step of attaching said prepackaged air bag unit to said container comprising wedging the wedge-shaped fasteners on the prepackaged air bag unit into locking engagement with the wedge-shaped receptacles on the container to attach the prepackaged air bag unit to the container.

22. A method as set forth in claim 20, wherein the step of providing a container comprises the step of dividing the cavity into a pair of compartments and simultaneously applying reinforcement to the container in a manner which resists deformation of selected portions of the container under the pressures generated during deployment of an air bag therefrom.

23. A method as set forth in claim 22, including the step of sliding a reaction device into the container to divide the container into said pair of compartments and to simultaneously apply reinforcement to the selected portions of the container.

24. Apparatus comprising a vehicle air bag module comprising a container with an inflator and a prepackaged air bag unit therein, said prepackaged air bag unit comprising an air bag in a predetermined folded configuration and packaging material substantially surrounding said folded air bag and maintaining said folded air bag in said predetermined folded configuration, said prepackaged air bag unit being coupled with a predetermined portion of said container.

25. Apparatus as set forth in claim 24, wherein said prepackaged air bag unit has a continuous frame member incorporated into a portion of said air bag, said continuous frame member being coupled with said predetermined portion of said container to couple said air bag and said prepackaged air bag unit with said predetermined portion of said container.

26. Apparatus as set forth in claim 25, wherein a reinforcement member is attached to said continuous frame member, said reinforcement member being adapted to reinforce a selected portion of said container when said prepackaged air bag unit is coupled with said predetermined portion of said container.

27. Apparatus as set forth in claim 26, wherein said continuous frame member is riveted to said predetermined portion of s id container.

28. Apparatus as set forth in claim 27, wherein said continuous frame member is riveted to said predetermined portion of said container.

29. Apparatus for use in forming an air bag module comprising:
a reaction can having walls defining a receptacle, said walls having opposite pairs of inner surfaces with distal portions defining an opening in said reaction can,
a folded air bag disposed in said receptacle formed by the walls of said reaction can, said folded air bag having a gas inlet opening; and
a continuous retainer member incorporated into said air bag in the area of said gas inlet opening, said continuous retainer member having a shape conforming to the shape of said opening in said reaction can, said continuous retainer member being disposed inside said opening and adjacent the opposite inner surfaces of the distal portions of said walls, and said continuous retainer member being connected to said walls of said reaction can in force transmitting relationship with said opposite inner surfaces of the distal portions of said walls.

30. The apparatus of claim 29, wherein said opposite pairs of inner surfaces of said reaction can walls form a substantially rectangular opening in said reaction can, and said continuous retainer member comprises a substantially rectangular member adapted to be received by said substantially rectangular opening.

* * * * *